Dec. 26, 1939.  H. COLOMB  2,184,580
CAP JEWEL BEARING FOR CLOCKWORK MECHANISM
Filed May 25, 1938
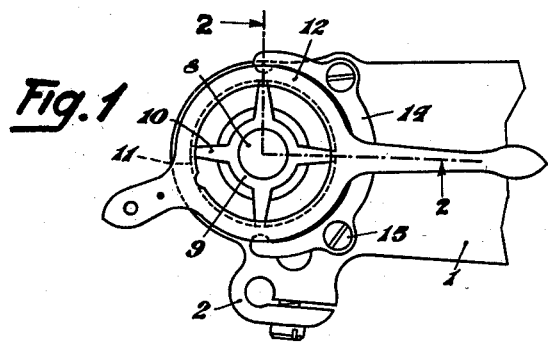
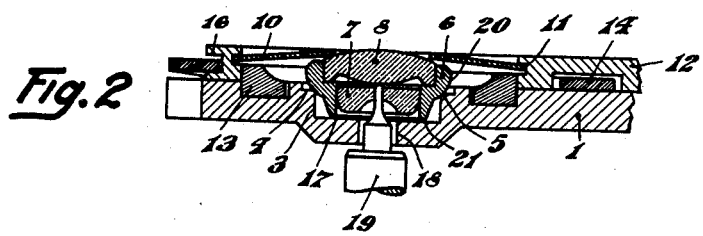
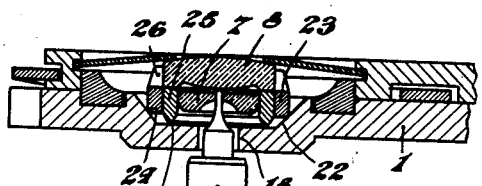
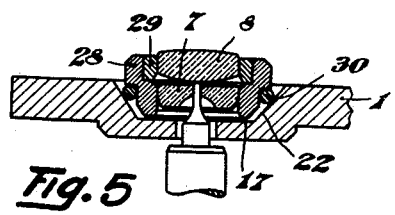
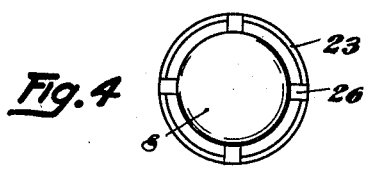
H. Colomb
Inventor
By Glascock Downing & Seebold
Attys.

Patented Dec. 26, 1939

2,184,580

UNITED STATES PATENT OFFICE 2,184,580

CAP JEWEL BEARING FOR CLOCKWORK MECHANISM

Henri Colomb, Lausanne, Switzerland

Application May 25, 1938, Serial No. 210,075
In Switzerland January 9, 1936

3 Claims. (Cl. 58—140)

This invention relates to pivot bearings for watch movements, of the type including a perforated bearing member and a cap bearing member which are yieldingly mounted so as to prevent shocks and jars from breaking the spindle supported in the bearing.

The primary object of the invention is the provision of means in a bearing of the above stated character permitting to obtain an extremely precise centering of the yieldable bearing portion in the relatively fixed bearing portion, so that the use of yieldably mounted bearing members will not be prejudicial for the maintenance of the high quality of the watch movement.

The accompanying drawings illustrate by way of example three forms of embodiment of the present invention.

Figure 1 is a fragmentary plan view of a balance wheel bridge on which the improved bearing is mounted.

Figure 2 is a vertical section along the line 2—2 of Figure 1.

Figure 3 is a vertical section through a modified form of a bearing according to the invention.

Figure 4 is a plan view of the movable part of this bearing.

Figure 5 is a vertical section of a further modification.

The bearing represented in Figures 1 and 2 is mounted on the balance wheel bridge 1 provided with the usual extension 2 adapted to carry a member to which one end of the spiral spring is attached. The bridge 1 is formed with a cavity 3 bearing an annular shoulder 4 provided with a slightly rounded or bevelled edge 5. This edge supports the movable bearing portion including an annular member 6 in which a perforated jewel 7 is fixedly mounted, while a cap jewel 8 is loosely inserted therein so as to be able to be separated for cleaning. The cap jewel 8 is held in its position by means of an annular spring 9 having four arms 10 which are engaged in a groove 11 of the spiral spring regulator 12. This regulator is rotatably mounted on a guide ring 13 inserted in the bridge 1, and is maintained by a spring 14 secured to the bridge by screws 15 and having its ends engaging a groove 16 of the regulator 12. The bottom 17 of the recess 3 in the bridge is provided with an aperture 18 for the passage of the balance spindle 19. The diameter of this aperture is slightly greater than the diameter of the spindle portion traversing it, so as to enable a slight lateral movement of the spindle when it becomes subjected to a shock.

The outer surface 20 of the annular bearing member 6 is of conical shape and coacts with the edge 5 of the shoulder 4 so as to be held in central position in the recess 3 owing to the pressure of the spring 9 acting on the cap jewel. Owing to the small dimensions of the bearing member 6, the outer diameter of which may approximately be one and one half millimeter for a bearing used in small wrist watches, the co-operation of the conical surface 20 with the edge 5 is alone not sufficient for centering the movable bearing portion in the fixed portion; the member 10 could remain in an inclined position without being brought back by the spring 9, so that the perforation in the jewel 7 would be laterally displaced and accordingly also the balance spindle. In order to avoid this inconvenience, the lower end face 21 of the annular member 10 extends into close proximity to the bottom face 17 of the recess 3. These two faces 17 and 21 accordingly form abutting surfaces when the bearing is subjected to a shock and prevent excessive inclination of the member 6, so that this member always returns into central position after it has been inclined owing to a shock, within the limits as permitted by the abutting surfaces. Also in the position of rest, in case the spring 9 would not act in rigorously axial direction on the member 6, the abutting surfaces prevent any prejudicial inclination of the member 6. These surfaces 17 and 21 are so close to each other as permitted by the precision of manufacture of the parts, and when machined with the highest possible precision, they will practically make contact with each other.

The example according to Figures 3 and 4 is similar to the one shown in Figures 1 and 2, except that of the two co-operating surfaces for centering the movable bearing in the recess of the bridge, the conical surface is provided on the fixed portion and the annular bevelled edge on the movable bearing.

The bridge 1 is provided with a recess having a conical wall 22 and aperture 18 in its bottom face 17 for the passage of the spindle 19. An annular member 23 has a slightly bevelled edge 24 resting on the conical surface 22. A bushing 25 carrying the perforated jewel 7 is mounted in the annular member 23. The cap jewel 8 is removably mounted in the upper portion of the member 23 which is rendered slightly flexible by slots 26. The spring 9, mounted in the regulator 12 as in Figure 2, yieldingly holds the movable bearing in place in the recess of the bridge 1. The abutting surfaces for limiting the inclination of the movable bearing are here formed by the bottom face 17 of the recess and by the end face 27 of the bushing 25 projecting beyond the annular member 23 into close proximity to the bottom face 17.

In Figure 5, the bridge 1 is again provided with a recess having a conical wall 22. The perforated jewel 7 is fixedly mounted in an annular member 28 which also carries the bushing 29 of the cap jewel 8. The annular member 28 is resting on the conical surface 22 of the bridge by the intermediary of a split ring 30 sprung on the member 28. The abutting surfaces for limiting the inclination of the movable bearing are constituted by the bottom face 17 of the recess in the bridge, and by the lower end face 31 of the annular member 28 which extends into close proximity to the bottom face 17. A spring, not shown, similar to the spring 9 in Figures 2 and 3, yieldingly holds the movable bearing in contact with the conical surface 22 of the bridge 1.

I claim:

1. In combination with a pivot bearing for watch movement spindle, a frame member having a recess provided at its bottom with a central aperture, a spindle extending freely through said aperture, a removable pivot bearing loosely carried in said recess and including a perforated member and a cap member so mounted as to remain firmly attached to each other whatever the thrusts on the pivot, said removable bearing extending into close proximity to the bottom face of the recess so as to coact therewith for limiting the rocking movement of the bearing in the recess, one pair of cooperating annular seating elements provided on the removable bearing and on the upper part of the recess respectively and comprising at least one conical surface, and a resilient member yieldingly holding the removable bearing in contact with the seating element of the recess and tending to center said bearing in the frame member.

2. In combination with a pivot bearing for watch movement spindle, a frame member having a recess provided at its bottom with a central aperture, a spindle extending freely through said aperture, a removable pivot bearing loosely carried in said recess and including a perforated member and a cap member so mounted as to remain firmly attached to each other whatever the thrusts on the pivot, said removable bearing extending into close proximity to the bottom face of the recess so as to coact therewith for limiting the rocking movement of the bearing in the recess, one pair of cooperating annular seating elements comprising a bevelled edge on the upper part of the recess and a conical outer surface on the bearing, and a resilient member yieldingly holding the removable bearing in contact with the seating edge of said recess and tending to center said bearing in the frame member.

3. In combination with a pivot bearing for watch movement spindle, a frame member having a recess provided at its bottom with a central aperture, a spindle extending freely through said aperture, a removable pivot bearing loosely carried in said recess and including a perforated member and a cap member so mounted as to remain firmly attached to each other whatever the thrusts on the pivot, said removable bearing extending into close proximity to the bottom face of the recess so as to coact therewith for limiting the rocking movement of the bearing in the recess, one pair of cooperating annular seating elements comprising a conical wall portion formed by the recess and a bevelled edge on the bearing, and a resilient member yieldingly holding the removable bearing in contact with the conical wall of said recess and tending to center said bearing in the frame member.

HENRI COLOMB.